United States Patent
Nuzman et al.

(10) Patent No.: US 8,018,868 B2
(45) Date of Patent: Sep. 13, 2011

(54) DEVICE AND ASSOCIATED METHOD FOR CROSSTALK ESTIMATION

(75) Inventors: Carl J. Nuzman, Union, NJ (US);
Adriaan J. de Lind van Wijngaarden, New Providence, NJ (US); Philip A. Whiting, New Providence, NJ (US); Jochen J. M. Maes, Veerle (BE); Gerhard G. T. Kramer, Los Angeles, CA (US); Hungkei Chow, Livingston, NJ (US); Alexei E. Ashikhmin, Morristown, NJ (US)

(73) Assignee: Alcatel Lucent, Paris (FR)

( * ) Notice: Subject to any disclaimer, the term of this patent is extended or adjusted under 35 U.S.C. 154(b) by 132 days.

(21) Appl. No.: 12/457,412

(22) Filed: Jun. 10, 2009

(65) Prior Publication Data
US 2009/0310502 A1 Dec. 17, 2009

(30) Foreign Application Priority Data
Jun. 16, 2008 (EP) .................................. 08290565

(51) Int. Cl.
*H04L 12/26* (2006.01)
(52) U.S. Cl. ........................................ 370/252
(58) Field of Classification Search .............. 370/201, 370/241, 252, 276, 282, 286; 375/219, 222
See application file for complete search history.

(56) References Cited

U.S. PATENT DOCUMENTS

| | | | | |
|---|---|---|---|---|
| 7,742,387 | B2 * | 6/2010 | Hobbel | 370/201 |
| 2008/0285740 | A1 * | 11/2008 | Schelstraete et al. | 379/406.06 |
| 2009/0046568 | A1 * | 2/2009 | Xu | 370/201 |
| 2009/0092036 | A1 * | 4/2009 | Peeters et al. | 370/201 |
| 2009/0245081 | A1 * | 10/2009 | Ashikhmin et al. | 370/201 |
| 2010/0046593 | A1 * | 2/2010 | Schenk et al. | 375/222 |
| 2010/0046684 | A1 * | 2/2010 | De Lind Van Wijngaarden et al. | 375/363 |
| 2010/0128767 | A1 * | 5/2010 | Zirwas | 375/222 |
| 2010/0238785 | A1 * | 9/2010 | Hobbel | 370/201 |

FOREIGN PATENT DOCUMENTS

WO WO 2008/024967 2/2008

OTHER PUBLICATIONS

Upside Labs, "G.vds12: pilot sequence assisted vector channel estimation", ITU-T Study Group 15-Contribution 177; COM 15-C 177-E, Oct. 2006, pp. 1-6, XP002505924.
France Telecom: "G.vds1: Update of the channel estimation matrix during the insertion of a new user", ITU-T Study Group 15-Contribution 511; COM 15-C 511-E, May 2007, pp. 1-4, XP002505925.
Cendrillon R. et al., "Partial crosstalk precompensation in downstream VDSL", Signal Processing, Nov. 1, 2004, vol. 84, No. 11, pp. 2005-2019, Elsevier Science Publishers B.V, Amsterdam, NL.

* cited by examiner

*Primary Examiner* — Chi H Pham
*Assistant Examiner* — Robert Lopata
(74) *Attorney, Agent, or Firm* — Harness, Dickey & Pierce, PLC

(57) ABSTRACT

The present invention relates to a crosstalk estimation device for estimating crosstalk between communication lines in a precoding group. The crosstalk estimation device comprises transmission means for transmitting a pilot sequence and reception means for receiving error feedback on one or more communication lines in the precoding group. The crosstalk estimation device further comprises crosstalk estimation means for combining the pilot sequence with the error feedback in order to obtain a crosstalk estimation between the communication lines. The device further comprises selection means for selecting a subset of one or more communication lines from the precoding group. The transmission means are adapted to transmit the pilot sequence only on the subset.

13 Claims, 2 Drawing Sheets

DEVICE AND ASSOCIATED METHOD FOR CROSSTALK ESTIMATION

FIELD OF THE INVENTION

The present invention generally relates to precoding on communication lines and in particular to a device and method for estimating crosstalk information which can be used in precoding on communication lines such as very high speed digital subscriber lines (VDSL) and VDSL2 lines.

BACKGROUND OF THE INVENTION

Various communication lines which operate within each others' vicinity may induce signals on each other. For instance two communication lines such as two VDSL2 lines which are collocated next to each other induce a signal in each other. Such signal is called crosstalk and has an influence on the quality of communication on these lines. Due to the induced crosstalk and noise from other sources in the surroundings of the communication line, the data transported on these lines may be affected or corrupted by the crosstalk and noise. Corrupted data needs to be corrected or transmitted again before the receiver can process the data. By reducing the crosstalk induced on a communication line or compensating the crosstalk induced on a communication line, the amount of corrupted data may be reduced, the need for error corrections or retransmissions is reduced, and the rate at which information can be reliably communicated is increased.

Various prior art solutions exist which are able to reduce the effects of crosstalk on communication lines and in particular on digital subscriber lines. These solutions are typically based on performing measurements on communication lines and adapting the operational conditions of the lines accordingly. Such measurements provide information concerning the crosstalk between various communication lines which can be used as an indication for line quality, attainable data rate, reliability of the communication channel, etc. The crosstalk channel coefficients can be used to reduce the effects of crosstalk on the communication line or to compensate for the crosstalk in order to remove the problem almost entirely.

Each communication line is a possible disturber line which induces crosstalk in one or more victim lines. By transmitting test signals across all the lines, it is possible to determine the influence of each offender line on the victim lines. The test signals can be characterized by the way in which power is allocated to one or more tones or frequencies. For instance a test signal may be transmitted using a particular power level over a small frequency range. The victim line may notice this power in that frequency range and be able to determine the amplitude of that power. The amplitude of the induced influence of crosstalk on a particular line is a good reference to determine how strong particular crosstalkers are or which frequencies or tones are susceptible to the crosstalk of certain crosstalkers. In particular, if each possible communication line which may induce crosstalk (also called a crosstalker) emits a distinct power spectrum as test signal, it is possible to detect which crosstalker or crosstalkers are inducing noise on a given victim line.

The information obtained by such measurements can then be used to group communication lines in physical groups or logical groups or binders, define the transmit spectra on the communication lines, etc. This enables a network operator to configure lines in such a way that crosstalk is avoided as much as possible or that the effects of crosstalk are reduced. For instance by selecting a transmit spectrum on a victim line in such a way that frequencies or tones with strong crosstalk influences from offender lines are avoided, the quality of the victim line is improved and the crosstalk is reduced.

A problem with the above given approach is that it is difficult to adjust transmit power spectra of lines in operation. Such changes reduce the throughput of the line significantly and may even lead to a service outage for a user when a line has to be reconfigured. Thus the above described technique can only be used for upcoming lines which may also be called joining lines and may not be able to handle significant changes in crosstalk once the line is in operation. In addition, the measurements can be performed relatively easily by transmitting a particular power on the possible disturber lines. However by altering the transmit power or power spectral density (PSD), it is only possible to measure or estimate the amplitude of the crosstalk. The phase of the crosstalk signal cannot be assessed using such a technique. This means that the exact crosstalk channel, described mathematically by complex coefficients having both magnitude and phase, is not known.

Precoding techniques are based on transmitting an additional signal on top of the data signal which is used to compensate the crosstalk on a victim line from external sources. Thus, instead of reducing the effect of crosstalk or avoiding crosstalk effects by configuring the communication line in an appropriate way, precoding can be used to compensate for the effects of crosstalk on a communication channel. Precoding techniques are based on crosstalk channel information that includes both amplitude and phase information. Such information can be obtained from measurements such as slicer error or SNR. A particular example of such measurements for precoding is the use of pilot sequences and error feedback. The use of pilot sequences in G.vdsl2 or g.vector is described in contributions to ITU study group 15 question 4/15 such as those from Upzide Labs titled "G.vdsl2 pilot sequence assisted vector channel estimation" (C-0177, Geneva, October 2006) and Ikanos Communications titled "G.vdsl crosstalk channel estimation with improved convergence" (NC-082, Napa Valley, April 2007). The term error feedback, as used in this document, refers to a means by which the receiver of a communication system such as a CPE communicates to the transmitter of the communication system such as a DSLAM one or more received signal errors, or values derived from received signal errors. Received signal errors can be defined as the difference between the received signal and an estimate of the transmitted signal.

These papers describe the use of a particular pilot sequence on each communication line in order to estimate the crosstalk channels between the communication lines. For those skilled in the art it is clear that according to these papers, it is possible to use orthogonal pilot sequences for each of the communication lines in a precoding group. Thus, on each communication line a pilot sequence is transmitted which may influence other communication lines in the precoding group.

A pilot sequence, in particular in DSL technology, is a series of pilot signals which are transmitted for instance downstream from the Digital Subscriber Line Access Multiplexer (DSLAM) to the Customer Premises Equipment (CPE) and can for instance be described as a sequence of constellation points in a 4-QAM constellation. On a communication line, all active sub-carriers are modulated by two bits, either both zero (00) or both one (11), from the sync-frame using 4-QAM. The constellation points are rotated using a quadrant scrambler and due to the operation of the scrambler, it only has to be taken into account when crosstalk coefficients are determined. The constellation points 00 or 11 are transmitted downstream during a sync symbol on the communication line. Such sync symbols are periodically transmitted, typically after every 256 data symbols. The constellation points 00 and 11 have a complex representation being "+1+j" for 00 and "−1−j" for 11. For simplicity throughout this text, the constellation point 00 will be represented as '1' and the constellation point 11 will be represented as '−1'.

A pilot sequence is a series of such constellation points, each transmitted in a separate sync symbol. For instance, a pilot sequence may consist of a sequence of 1 and −1 which is transmitted over the communication line, each sync symbol containing one of the points in the sequence. Since these points are defined and thus known to the receiver, it is possible to determine the difference between the expected symbol and the actual received symbol. This difference, which includes interference and noise can then be fed back to the DSLAM. The DSLAM is then able to correlate the error feedback and the pilot sequence in order to obtain the amplitude and phase of the crosstalk from one line to another line.

A first drawback of the existing solution is that the estimation requires a long period of time when the number of communication lines in the preceding group is high. Large precoding groups also require a large amount of processing power and storage to store and process all the error feedback information and to combine transmitted pilot sequences with the error feedback to obtain an estimation of the crosstalk.

A second drawback is found in a scenario where there are strong and weak crosstalkers in a precoding group. Some offender lines affect victim lines significantly more strongly than other offender lines. The influence of the weaker crosstalkers may therefore be irrelevant as their influence is negligible compared to that of the strong crosstalkers. The existing solutions devote equal time and computation to determining strong and weak crosstalkers and generally provide a complete estimation of all the crosstalk coefficients, which may be a waste of computational power and time because information from the strong crosstalkers alone may be sufficient to perform precoding in the preceding group.

A third drawback is that when a joining communication line is initialized, crosstalk estimates are required for that communication line and in particular the influence of that line on other lines in the precoding group is of importance. However the existing solutions are only able to estimate crosstalk for the entire group which means that when a line joins, it may take some time before sufficient information is available to configure the line and to perform accurate precoding.

When considering DSL lines, precoding is a new technique which is introduced to VDSL2 in the G.Vector extension thereof. However not all equipment supports the G.Vector specifications and thus not all communication lines are vector-enabled lines. Communication lines which only support the VDSL2 standard specification are called legacy lines. The sync symbols are defined in the VDSL2 standard specification for legacy lines. This means that transmitting a pilot sequence on a legacy line may conflict with the standard specification. Furthermore, legacy lines are generally unable to communicate errors measured on the sync symbols to the DSLAM. As a result, the existing systems have difficulties in obtaining crosstalk information in a precoding group which consists of both legacy lines and vector-enabled lines.

It is an objective of the present invention to provide a device for estimating crosstalk in a preceding group which is able to estimate crosstalk with reduced computational power. It is another objective of the present invention to improve crosstalk estimation in a preceding group with legacy lines and vector-enabled lines. It is yet another objective of the present invention to obtain information on lines of interest. It is another objective of the present invention to reduce the per-estimate delay.

SUMMARY OF THE INVENTION

The objectives of the present invention are realized by a crosstalk estimation device for estimating crosstalk between communication lines in a preceding group comprising:
 transmission means for transmitting a pilot sequence;
 reception means for receiving error feedback on one or more communication lines in the precoding group; and
 crosstalk estimation means for combining the pilot sequence with the error feedback in order to obtain a crosstalk estimation between the communication lines,
characterized in that the device further comprises selection means for selecting a subset of one or more communication lines from the precoding group, and further characterized in that the transmission means are adapted to transmit the pilot sequence only on the subset.

Optionally the crosstalk estimation device according to the present invention may further comprise means for selecting said pilot sequence based on the number of communication lines in the subset.

Indeed, by selecting a subset of communication lines from the precoding group and transmitting the pilot sequences only on the communication lines in the subset, it is possible to determine the crosstalk effects of the lines in the subset on other lines in the preceding group which may or may not be part of the subset.

The present invention is based on the insight that the length of a pilot sequence (L) depends on the number of communication lines whereon a pilot sequence is transmitted (M) to determine crosstalk coefficients. When the sequences are chosen, it is preferred to do so under the constraint that every pair of sequences should be mutually orthogonal. As a result of that constraint, the minimum length of the pilot sequence L equals the number of lines M. However the use of constant sequences should be avoided to reduce a contamination from noise or interference which has a non-zero mean, the constant sequences. In order to have sufficient combinations and especially when orthogonal sequences are desired, in combination with the desire to avoid the use of a constant sequence, the length of the pilot sequence is taken as $L \geq M+1$.

The relation between the length of the pilot sequence and the number of lines which are currently examined has as a consequence that for large precoding groups, the pilot sequence has a large length. For instance if a precoding group consists of 50 lines, the pilot sequences must be at least 51 symbols long. Thus the prior art solutions would need to wait until those 51 symbols have been transmitted and error feedback of a 51 symbols has been received by the transmitter. In addition to the delay of transmitting those symbols and receiving the error feedback for all those symbols, this also requires a significant amount of storage and processing power. Error feedback on each symbol is received from each line, thus 50 lines have to provide error feedback information on 51 symbols.

The selection of the subset with K lines reduces the number of M lines whereon a pilot sequence is transmitted. When a subset of for instance K=5 lines is selected out of M=50 lines, the pilot sequences are of length L=K+1=6. This means that only 6 sync-symbols are required to transmit an entire pilot sequence which is much shorter than when all the lines are tested simultaneously. In addition to a reduction in delay between starting the transmission of the pilot sequence and obtaining all the error feedback information, the computational power and storage requirements are reduced over the prior art sequences. In case a preceding group consists of 50 lines and a subset is 5 lines, the system still needs to obtain information from those 50 lines. However, each of these lines only has to provide error feedback over 6 symbols instead of 51 which is a large reduction. A feedback subset may be selected from the preceding group, as an alternative to obtaining error feedback from all lines in the precoding group. The feedback subset may overlap with the subset selected for transporting the pilot sequences or may consist of lines whereon no typical pilot sequence is transmitted. Having two subsets, one of lines whereon the pilot sequences are transmitted and one whereon error feedback is collected may reduce the required processing and storage even more. In such scenario, both the length of the pilot sequences is reduced and the number of lines which provide feedback.

An important advantage of the present invention can be found in scenarios where a particular joining line in the precoding group changes from an inactive line to an active line. Joining lines introduce new crosstalk on active lines which means that their influence on the other lines has to be determined and eliminated by precoding before the joining line begins normal full-power transmission. Otherwise, the joining line may interrupt active lines or reduce the signal quality of active lines significantly.

It is therefore beneficial to find ways to estimate crosstalk from a joining line quickly, so that the joining line can quickly begin normal full-power transmission without harming other lines. To obtain the shortest delay, it is beneficial to select a subset of K=1 line where that single line is the joining line. For a subset of K=1, the pilot sequence is of length L=2 which means that the delay to estimate the crosstalk of that particular joining line on other lines is reduced to the transmission of only two symbols. Even if all lines in the preceding group are taken into consideration when determining the crosstalk information, thus feedback information is received and used from each line in the precoding group except the joining line which is transporting the pilot sequences, this reduces the computational requirements and time required for the computation of crosstalk information significantly. This means that repeated measurements, each consisting of error feedback from L=2 symbols, can be performed on the joining line during initialization. Repeated measurements in a smaller time-frame have as a result that the power at which the joining line is allowed to operate can increase at a higher rate than in a situation where longer sequences are used, for example as would be necessary if unique orthogonal pilot sequences are sent on all communication lines.

The error feedback measurement on lines may be something which is performed automatically or which may be coordinated. In certain embodiments, a receiver such as a CPE may always perform measurements on received signals and provide error feedback to a transmitter such as a DSLAM based on those measurements. The receiver or CPE may perform those measurements on every signal or on particular signals or symbols. However a transmitter or DSLAM may instruct the receiver or CPE to perform error measurements on a certain signal or symbol for a particular period of time or number of symbols or until the DSLAM instructs the receiver or CPE to stop measurements. In case of measurements which are performed continuously on particular symbols and error being fed back as soon as the measurement has ended, a DSLAM is able to determine crosstalk information by simply initiating the transmission of pilot sequences as the error feedback will be available anyway. Due to the potential high number of CPE's or receivers connected to a DSLAM or transmitter, sending instructions to each CPE may introduce a large load on the DSLAM to coordinate the instructions and introduces additional load on the communication lines whereon the instructions are transmitted. The error feedback information may be transmitted back as soon as it is available or may be collected at the CPE side until all measurements are performed. The advantage of feedback as soon as available is that each error feedback communication requires a small piece of the available bandwidth on the communication line whereas sending all the data back in a single transmission may require a higher peak bandwidth. The DSLAM may be able to request the error feedback information from the CPE or the CPE may deliver the information to the DSLAM automatically.

It is important to realize that in view of the present invention, signals which are transported on communication lines which are not part of the subset are not considered pilot sequences. Communication lines which are not part of the selected subset typically will also transport a particular signal while the lines in the subset transport their pilot sequence. For instance where pilot sequences are transported in the sync symbol on each line, the lines of the precoding group not part of the subset may transport a symbol in their sync symbol. Of course, care should be taken to ensure that the signals transported in the sync symbol on lines not in the subset are distinguishable from those used in the pilot sequences. When pilot sequences are equal to or are strongly correlated with the signals transported in the sync symbols of lines not in the subset, it is difficult or impossible to accurately estimate crosstalk coefficients from lines in the subset, using error feedback. On the other hand, when pilot sequences are orthogonal to the signals transported in the sync symbols of lines not in the subset, these latter signals do not interfere at all with the ability to estimate crosstalk coefficients from lines in the subset, using error feedback.

Optionally the crosstalk estimation device according to the present invention may further comprise means for estimating crosstalk based on a correlation between the error feedback and the pilot sequence.

The device which transmits the pilot sequences such as a DSLAM is aware of the transmitted pilot sequences. By receiving the error feedback information from the device which receives the pilot sequences such as a CPE, the device is able to determine the crosstalk coefficients of the crosstalk channels between the lines whereon pilot sequences are transmitted and the lines wherefrom error feedback information is used. The crosstalk coefficients can be determined based on a correlation between the transmitted pilot sequence and the received error feedback. The correlation ensures that an exact estimation of the crosstalk coefficients is obtained and that the crosstalk channels are characterized accurately. Such accurate information can then be used to adapt the preceding in order to substantially eliminate interference from existing crosstalk channels.

Optionally the transmission means of the crosstalk estimation device according to the present invention may be adapted for transmitting a distinct pilot sequence on each of the communication lines in the subset.

Further optionally, the pilot sequence may be a non-constant sequence.

The use of error feedback information is sufficient to determine the crosstalk channels that influence a given communication line. It is therefore possible to transmit a pilot sequence on each line in the subset and use the same sequence on all the communication lines in the set simultaneously. The disadvantage of this technique is however that it is impossible to uniquely identify the influence of a particular line in the subset on other lines in the precoding group.

By using distinct pilot sequences on the communication lines in the subset, it is possible to determine the exact crosstalk channel coefficients between the line which transports a particular pilot sequence and every line in the preceding group from which error feedback information is gathered. Having distinct pilot sequences for each communication line ensures that each existing crosstalk channel is known rather than a general idea of the overall crosstalk effects on a particular line.

Distinct pilot sequences are pilot sequences such that no two pilot sequences are identical. In addition, it is beneficial to choose pilot sequences that are mutually orthogonal, meaning that the correlation between each pair of sequences is zero. In addition, it is beneficial to ensure that the pilot sequences are also orthogonal to any normal transmissions on other communication lines which are not in the subset in the symbols wherein the pilot sequences are transmitted. The sequences are preferably made up out of 1 or −1 and frequent changes are preferred. Signals which are generally constant, for instance sequences with only one change from 1 to −1 or vice versa) may resemble control signals on communication lines and may therefore lead to problems and should be avoided.

Optionally the transmission means of the crosstalk estimation device according to the present invention may be adapted to transmit the pilot sequence in one or more sync symbols.

Further optionally the crosstalk estimation device according to the present invention may further comprise means for inducing an additional sync-flag into the communication lines.

The G.Vector community considers transmitting the pilot sequences on the sync symbol which is transmitted via a communication line. Legacy lines use the sync symbol to transport sync-flags from transmitter (such as a DSLAM) to receiver (such as CPE). For instance when On-Line Reconfiguration requests are transmitted from the CPE to the DSLAM, the DSLAM acknowledges the receipt of the OLR request by sending a sync-flag. A sync-flag is typically a change in the sign in the sync symbol, either from 1 to −1 or from −1 to 1 whereas otherwise this symbol is constant. However for vector-enabled lines the use of the sync symbols is not defined in a standard specification and thus these symbols could be used for other purposes such as transmitting pilot sequences.

Because legacy lines do not provide the functionality to measure error signals on the sync symbols and to provide error feedback to the transmitter or DSLAM, it is not possible to use the error feedback method to determine the crosstalk induced on these lines by other lines. However by inducing additional sync-flags, it is possible to effectively transmit a pilot sequence over legacy lines. Thus by providing means for inducing sync-flags, it is possible to determine the crosstalk induced by a legacy line on a communication line operating according to the G.Vector specifications also called a vector enabled line. Vector enabled lines are able to determine error information on received sync symbols and are able to feed back such error information to the transmitter.

Sync-symbols sent from the DSLAM at the CO to the CPE over a legacy line are interpreted by the CPE according to the standard specification. Thus any sync-symbol which is sent as part of a pilot sequence is interpreted in a standardised way by the CPE. To overcome this problem, the DSLAM may induce additional sync-flags on the line which can then be used as elements of a pilot sequence. A first way of inducing a sync-flag which can be used as part of a pilot sequence is by reducing the power from the DSLAM side on one or more tones. By reducing the power on a small number of tones, the effect of the power reduction is negligible but a bitswap is called for. As a consequence of the power reduction, the CPE will request a bit swap. Such a request has to be acknowledged by the DSLAM via a sync-flag sent to the CPE. This sync-flag could be used as an element in the pilot sequence. Alternatively the DSLAM could just transmit an unexpected sync-flag to the CPE. If the CPE does not expect such a sync-flag, for instance because no OLR request was made, it may discard the sync-flag. These two forms of inducing can be used to transmit the pilot sequence and thus provide information on the crosstalk influence from a legacy line on a vector enabled line. However this also means an overloading of the sync-symbols and additional load on the CPE and the control channel. It may therefore be beneficial to limit the use of induced sync-flags where possible. It can be beneficial to use small subsets and short sequences when estimating crosstalk from legacy lines, because the legacy lines are only required to send induced sync-flags when they belong to the subset, and they do not need to send induced sync-flags when they do not belong to the subset.

The technique of inducing sync-flags is advantageous in that it enables the transmission of pilot sequences over legacy lines. This means that in a preceding group crosstalk information is available from vector-enabled lines to vector-enabled lines and from legacy lines to vector-enabled lines. As a consequence, complete crosstalk information is available for the vector-enabled lines which allows the use of precoding on all the vector-enabled lines in the precoding group.

Optionally the crosstalk estimation device according to the present invention may further comprise means for selecting a tone subset of one or more tones for each communication line in the subset of communication lines and means for transmitting the pilot sequence only in the tone subset.

Further optionally the crosstalk estimation device according to the present invention may further comprise means for interpolating error feedback information and/or crosstalk coefficient estimates for tones not in the tone subset.

It is typically envisioned that when the communication lines are based on a discrete multi-tone (DMT) system, the same element of the pilot sequence assigned to that communication line would be sent on each tone during the sync symbol. For example, if the assigned pilot sequence for a communication line in the subset was [1,1,−1,−1], the transmitter would send a "1" on all tones, then later send the value "1" on all tones, then send "−1" on all tones and finally send "−1" on all tones. Typically in the G.Vector case this 1 or −1 would be sent during a sync symbol which alternates with data symbols being transmitted on the line.

As discussed above, a general scheme for creating pilot sequences for such a system works as follows. There are M lines and a subset of K lines is selected for estimation. K pilot sequences, preferably mutually orthogonal pilot sequences, of length $L \geq K+1$ are selected (using, for example, Walsh-Hadamard sequences). With these parameters, the estimation procedure takes a set of pilot sequences of length L to obtain an estimate for K lines.

It is however possible to achieve a more favorable trade-off by estimating the crosstalk coefficients on a subset of tones and preferably obtaining the rest of the coefficients by interpolation. This takes advantage of the smoothness in the crosstalk coefficients as a function of tone index. Assuming that the crosstalk channels are appropriately smooth, this allows one to reduce the time and/or complexity required to achieve a given accuracy.

We introduce a new parameter W, which represents the spacing between the tones selected for the tone subset. That is, if W=1, all tones will be estimated and thus the elements of the pilot sequence will be transmitted on all tones on the communication line. If W=4, one will directly estimate the crosstalk only on one out of every four tones and thus the elements of the pilot sequence will be transmitted on every fourth tone on the communication line. We still have M lines, and we choose K (preferably mutually orthogonal) pilot sequences of length L>K+1 in order to be able to target K lines on a given tone at one time. An advantage is that when each of the K pilot sequences is assigned to W different lines, N=KW lines have sequences assigned in any one iteration. Thus, the same pilot sequence can be used to estimate crosstalk channel coefficients of W lines by using different tones to transport the pilot sequence on each communication line. The crosstalk channel coefficients of a subset of N lines in a preceding group can therefore be estimated using only N/W distinct pilot sequences.

A particular example of how a pilot sequence can be arranged on the tones is given below. However it should be noted that the person skilled in the art may consider other ways of arranging the pilot sequences on the tones. The first of the W lines sharing a pilot sequence transmits the pilot sequence on tones with index k such that k mod W=1. The second line transmits the pilot sequence on tones such that k mod W=2, and so on. In other words, the first tone transports the first element of the pilot sequence on a first line, the second tone transports the first element of the pilot sequence on a second line, etc. After W tones, the second element of the pilot sequence is transmitted on the first line in tone W+1, the second element of the pilot sequence is transmitted on the second line in tone W+2, etc. All other tones being the tones not in the tone subset transmit a sequence which is not used for crosstalk channel estimation and is generally a constant sequence. For example, on the first line, tones 2 through W, W+2 through 2 W, and so on transmit a constant sequence. Finally, all lines that are not part of the subset in a given iteration transmit a sequence which is not used for crosstalk estimation and is generally a constant sequence on all tones.

After the sequences of length L have been sent, the system can directly estimate the crosstalk coefficients on all the tones in the tone subset on the lines in the subset of communication lines. On a given line in the subset, there will be estimates for one out of every W tones. The coefficients for the remaining tones on that line can be estimated by interpolation between the directly estimated coefficients.

With these parameters, the estimation procedure takes time L to obtain estimates for WK lines, with computational and storage complexity proportional to MK. The variance of the estimate is proportional to 1/L, and the total time required to get estimates for all lines is ML/(WK).

The benefit of the invention is to increase by a factor of W>1 the number of lines whose crosstalk coefficients can be simultaneously estimated, with a similar complexity. This reduces the amount of time required to estimate all lines by a factor of W. The maximum value of W that can be used is determined by the smoothness of the crosstalk channels as a function of frequency.

Optionally the selection means of the crosstalk estimation device according to the present invention may be adapted to select the subset based on one or more of the following:
  an indication of an upcoming communication line in the preceding group;
  an indication of legacy or vector-enabled communication lines in the preceding group;
  awareness of strong crosstalkers in the preceding group;
  evolution of crosstalk in the preceding group over time; and
  knowledge of corrupted or missing error feedback measurements.

Information such as indications or identifications of an upcoming communication line in the precoding group may be used to determine which lines will form part of the subset. For instance any upcoming or joining communication line may be a trigger to perform crosstalk estimation on a subset of one line being the joining line. This way the available crosstalk channel coefficients can be updated accordingly to incorporate the new line and the changes in crosstalk.

In certain situations it may be desired to only include a certain type of lines in the subset. Legacy lines are only able to transport pilot sequences under certain conditions and cannot provide error feedback. It may therefore be preferred to only use the pilot sequences on vector-enabled lines. Selecting only vector-enabled or legacy lines may also determine how the pilot sequences are transmitted. For instance if there are no legacy lines in the subset, the transmitting device may disable means to induce sync-flags. As another example, the transmitting device may use small subsets and short sequences when estimating crosstalk from legacy lines, and larger subsets and longer sequences when estimating crosstalk from vector enabled lines.

When a certain preceding group contains a number of strong crosstalkers, it may be beneficial to take these known strong disturber lines in a subset. Generally the crosstalk information obtained from strong crosstalkers will be representative for the major portion of all the crosstalk in the precoding group. Thus, by only determining the crosstalk coefficients for the crosstalk channels related to the strong crosstalkers, a good estimation of the overall crosstalk can be made and resources can be saved when compared to determining all crosstalk channels in the precoding group. In addition, crosstalk induced by a given communication line may change over time. Such information may be taken into account when selecting a subset. For instance, when the changes in crosstalk are beyond certain thresholds, the system may re-evaluate more often the crosstalk channels related to that specific line whereon the crosstalk has changed. This way the information can be kept up-to-date without measuring crosstalk channels for all lines in the preceding group.

In some cases, error measurements at the CPE may be corrupted by impulse noise, or error measurements sent from the CPE to the CO may not be received correctly. In this case, the available error measurements may be sufficient to estimate certain crosstalk coefficients accurately, and not sufficient to estimate other coefficients. In such a case, the subset could be chosen to include lines whose crosstalk coefficients are still unknown due to the lost or corrupted error measurements.

Optionally the communication lines in said preceding group and the communication lines in said subset are digital subscriber lines.

Further optionally the crosstalk estimation device according to the present invention may be integrated into a digital subscriber line access multiplexer and/or a network analyzer.

Network equipment such as a DSLAM or other access multiplexer, network analyzer, etc are ideally suited to keep track of crosstalk channel coefficients. Access multiplexers are directly involved in the communication lines whereon data is transported and for which the crosstalk channel coefficients are determined. An access multiplexer is coupled to these communication lines and transmits and receives information over the communication lines. The DSLAM can therefore control the transmissions by having a crosstalk estimation device according to the present invention integrated. Similarly, a network analyzer may be able to keep track of all the crosstalk channels in the network and may be able to instruct access multiplexers to perform certain crosstalk channel estimations.

Optionally in the crosstalk estimation device according to the present invention, the number of communication lines in the subset is at least one and is less than the total number of communication lines in the preceding group.

In view of the above given explanation related to the length of the pilot sequences being related to the number of lines whereon pilot sequences are transmitted, the crosstalk estimation device may be adapted to select at least one but less than the total number of lines in the preceding group for the subset. Small subsets provide crosstalk channel coefficients at a higher speed than larger subsets, but larger subsets may provide a higher accuracy of the estimations. The ideal size may depend on selection criteria for adding a line to the subset, desired performance in terms of accuracy and delays and other factors such as the number of available communication lines in the preceding group, already available crosstalk information, etc.

The present invention further also relates to a method for estimating crosstalk between communication lines in a precoding group comprising the steps of:

transmitting a pilot sequence;
receiving error feedback on one or more communication lines in the precoding group; and
combining the pilot sequence with the error feedback in order to obtain a crosstalk estimation between the communication lines, characterized in that the method further comprises the step of selecting a subset of one or more communication lines from the precoding group, and further characterized in that the step of transmitting a pilot sequence is adapted to transmit the pilot sequence only on the subset.

DETAILED DESCRIPTION OF EMBODIMENT(S)

Figure 1:
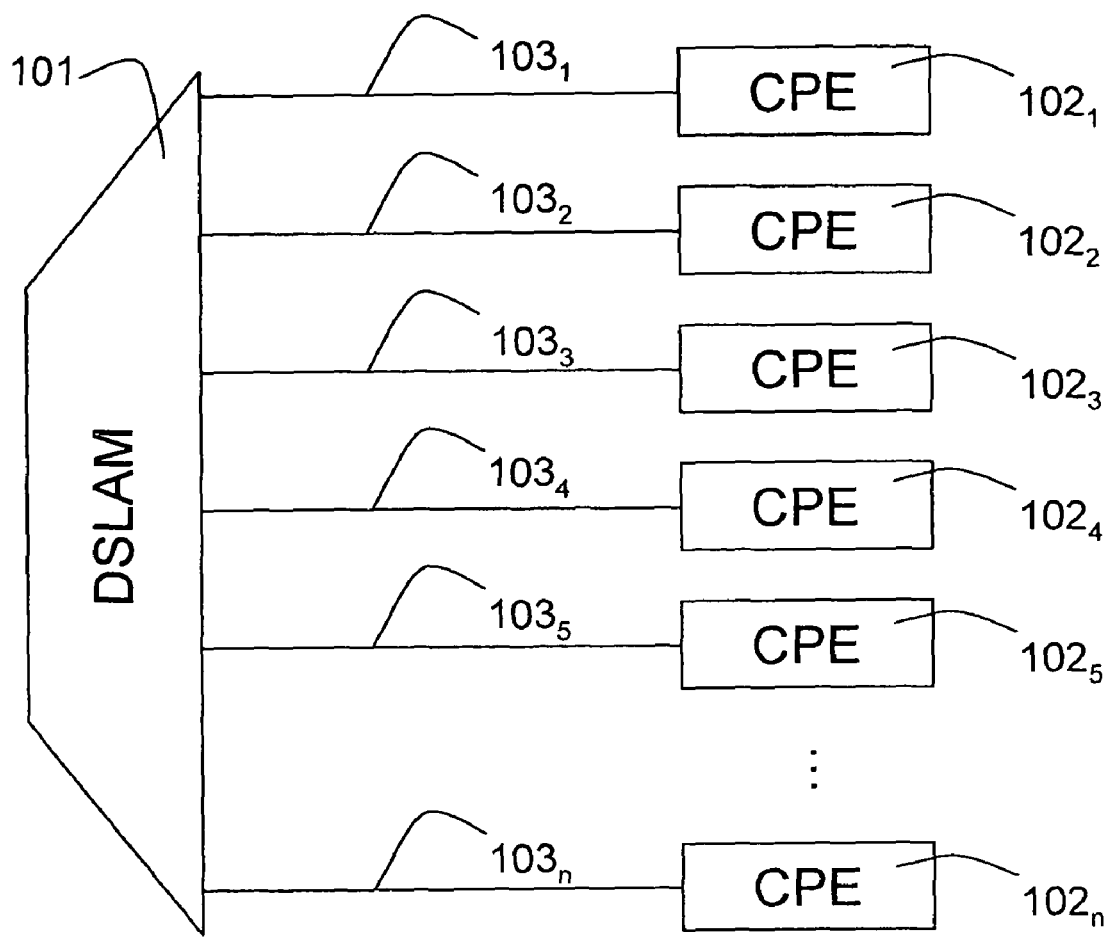
FIG. 1 illustrates an overview of a DSLAM wherein an embodiment of the present invention is incorporated which is connected to a number of CPE devices.

FIG. 1 shows a DSLAM 101 which is connected to a number of CPE devices $102_1$ to $102_n$. CPE $102_1$ to CPE $102_n$ are connected via respective VDSL2 lines $103_1$ to $103_n$. In this particular example the lines $103_1$ to $103_n$ all form part of the same precoding group and the precoding group in this example is limited to the lines $103_1$ to $103_n$.

In this particular embodiment, the DSLAM 101 is provided with a crosstalk estimation device according to the present invention. DSLAM 101 is thus able to define pilot sequences, select a subset of lines from lines $103_1$ to $103_n$, transmit a pilot sequence on each of the selected lines in the subset and receive error feedback from the CPE $102_1$ to $102_n$. The crosstalk estimation device in DSLAM 101 can then be used to determine the crosstalk channel coefficients which represent the crosstalk channels between the lines in the precoding group. For this example, we consider lines $103_1$ to $103_3$ as vector enabled lines and lines $103_4$ and $103_5$ as legacy lines.

Figure 2A:
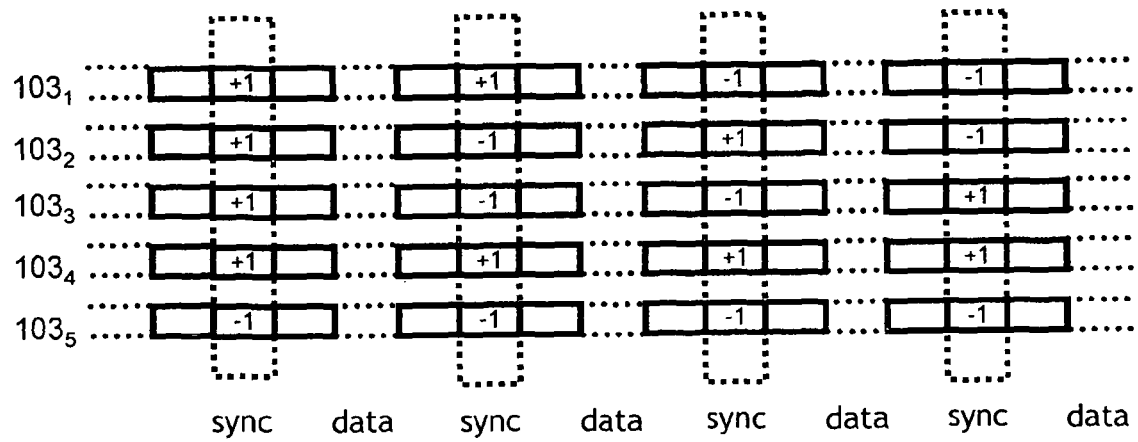
FIGS. 2a and 2b illustrate pilot sequences transmitted on communication lines.

In a first example, the DSLAM 101 selects lines $103_1$ to $103_3$ as subset of the precoding group. The DSLAM generates three orthogonal pilot sequences of length 4, one for each of the lines in the selected subset. The three pilot sequences are [1, 1, −1, −1], [1, −1, 1, −1] and [1, −1, −1, 1] which are destined for lines $103_1$ to $103_3$ respectively. FIG. 2a shows in more detail how these pilot sequences in this example are transported over the lines $103_1$ to $103_n$ over time. In this example, the DSLAM 101 is not interested in obtaining information about lines $103_4$ and $103_5$, and so transmits constant sync sequences on these lines.

FIG. 2a shows the symbols transported over the communication lines $103_1$ to $103_5$ in a certain time period. During this time period, a number of sync symbols and a number of data symbols are transmitted over the line from DSLAM 101 to the respective CPE $102_i$ to $102_5$. It should be noted that before the shown sync symbol, the line transports a data symbol, thus this figure does not necessarily start with a silent line or a line whereon no data is transported. It is however not excluded that on one or more of the shown lines, the sync symbol is the first signal transmitted over that line. The sync symbols on each of the lines are transmitted simultaneously. The first symbol of each pilot sequence is transmitted on each line simultaneously, then after a data symbol the second symbol of each pilot sequence is transmitted, and so on.

In this first example, it is assumed that the DSLAM 101 is interested in obtaining information about the crosstalk channels from the lines $103_1$ to $103_3$ onto all other lines in the precoding group. The DSLAM 101 of the precoding group monitors the error feedback from every line $103_1$ to $103_n$ and combines the pilot sequences with the error feedback to obtain the crosstalk information via a correlation. The DSLAM 101 also monitors the error feedback information from the lines $103_1$ to $103_3$ which make up the subset and whereon the pilot sequences are transmitted. If any legacy lines are present in the precoding group, the DSLAM 101 will not receive error feedback from those lines.

Figure 2B:
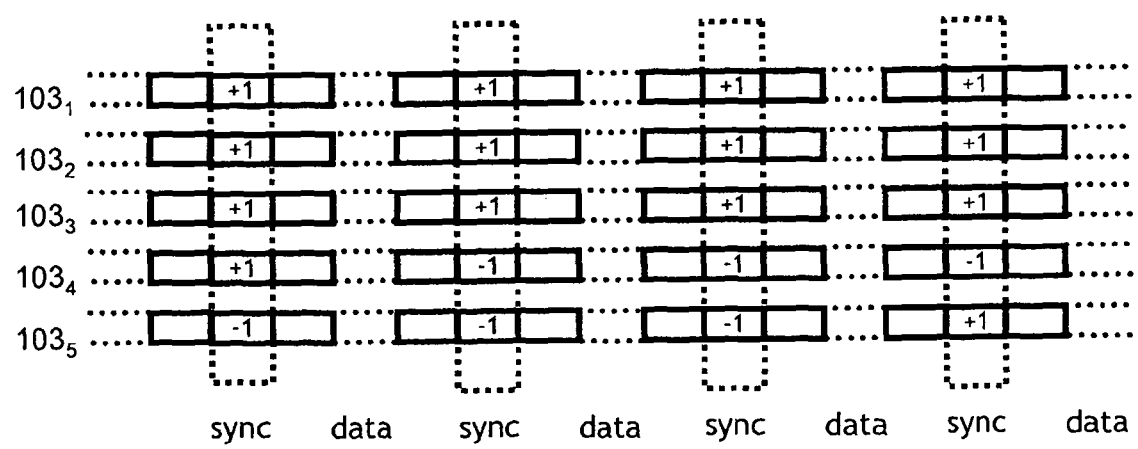

FIG. 2b shows a second example wherein both the vector-enabled lines $103_1$ to $103_3$ and legacy lines $103_4$ and $103_5$ are present. Similar to FIG. 2a, FIG. 2b illustrates the transmitted symbols over time. During the first two sync symbols, the DSLAM 101 is interested in obtaining information about the crosstalk channels from legacy line $103_4$. To get this information, the DSLAM 101 uses an induced sync symbol to transmit the pilot sequence [1, −1] on line $103_4$, and transmits a constant sequence on all other lines. The DSLAM correlates the error feedback received from vector enabled lines $103_1$ to $103_3$ during the first and second sync symbols with the pilot sequence [1,−1] to obtain estimates of crosstalk coefficients from line $103_4$ into lines $103_1$ to $103_3$. Similarly, during the third and fourth sync symbols, the DSLAM 101 is interested in obtaining information about the crosstalk channels from line $103_5$. To get this information, the DSLAM 101 uses an induced sync symbol to transmit the pilot sequence [−1, 1] on line $103_5$, and transmits a constant sequence on all other lines. The DSLAM correlates the error feedback received from lines $103_1$ to $103_3$ during the third and fourth sync symbols with the pilot sequence [−1, 1] to obtain estimates of crosstalk coefficients from line $103_5$ into lines $103_1$ to $103_3$. Because only one line is included in the subset of interest at a given time, each of the legacy lines is only required to use one induced sync flag in this example.

FIG. 1 shows a total of six communication lines connected to the DSLAM. However in a real world scenario, a DSLAM is typically connected to a larger number of lines than six. In addition, a precoding group may not be limited to the lines connected to a single DSLAM. A precoding group may for instance contain several tens of lines which are distributed over a number of DSLAMs. In such case, coordination between DSLAMs may be required. FIG. 1 furthermore only shows the elements in the communication network which are relevant for the understanding of the present invention. Therefore elements such as network equipment to which the DSLAM is connected, links connecting the DSLAM to such equipment, intermediary devices, etc. are not shown in this figure. It should be appreciated by those skilled in the art that a real world scenario typically contains a much more complex network topology than shown in this figure.

In addition, FIGS. 2a and 2b only represent an example of pilot sequences and how information is transmitted over a particular set of lines. It is obvious that other combinations of pilot sequences and line selections are also possible.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third" and the like, when used in the description or in the claims are introduced to distinguish between similar elements or steps and are not necessarily describing a sequential or chronological order. It is to be understood that the terms so used are interchangeable under appropriate circumstances and embodiments of the invention are capable of operating according to the present invention in other sequences, or in orientations different from the one(s) described or illustrated above.

The invention claimed is:

1. A crosstalk estimation device for estimating crosstalk between communication lines in a precoding group comprising:
   a transmitter configured to transmit a pilot sequence;
   a receiver configured to receive error feedback on one or more communication lines in said precoding group; and
   a crosstalk estimator configured to combine said pilot sequence with said error feedback in order to obtain a crosstalk estimation between said communication lines;
   a first selector configured to select a subset of one or more communication lines from said precoding group;
   a second selector configured to select the pilot sequence based on a number communication lines in said subset, wherein said transmitter is configured to transmit said pilot sequence only on said subset.

2. The crosstalk estimation device as defined in claim 1, wherein said crosstalk estimation device is configured to estimate crosstalk based on a correlation between said error feedback and said pilot sequence.

3. The crosstalk estimation device as defined in claim 1, wherein said transmitter is configured to transmit a distinct pilot sequence on each of said communication lines in said subset.

4. The crosstalk estimation device as defined in claim 1, wherein said pilot sequence is a non-constant sequence.

5. The crosstalk estimation device as defined in claim 1, wherein said transmitter is configured to transmit said pilot sequence in one or more sync symbols.

6. The crosstalk estimation device as defined in claim 1, wherein said device further comprises a processor to induce additional sync-flag into said communication lines.

7. The crosstalk estimation device as defined in claim 1, wherein said device further comprises a third selector to select a tone subset of one or more tones for each communication line in said subset of communication lines and the transmitter is configured to transmit said pilot sequence only in said tone subset.

8. The crosstalk estimation device as defined in claim 1, wherein said device further comprises a processor to interpolate error feedback information or crosstalk coefficient estimates for tones not in said tone subset.

9. The crosstalk estimation device as defined in claim 1, wherein said first selector is configured to select said subset based on one or more of the following:
   an indication of an upcoming communication line in said precoding group;
   an indication of legacy or vector-enabled communication lines in said preceding group;
   awareness of strong crosstalkers in said precoding group;
   evolution of crosstalk in said precoding group over time; and
   knowledge of corrupted or missing error feedback measurements.

10. The crosstalk estimation device as defined in claim 1, wherein said communication lines in said precoding group and said communication lines in said subset are digital subscriber lines.

11. The crosstalk estimation device as defined in claim 10, wherein said device is integrated into a digital subscriber line access multiplexer and/or a network analyzer.

12. The crosstalk estimation device as defined in claim 1, wherein the number of communication lines in said subset is at least one and is less than the total number of communication lines in said preceding group.

13. A method for estimating crosstalk between communication lines in a precoding group comprising:
   transmitting a pilot sequence;
   receiving error feedback on one or more communication lines in said precoding group; and
   combining said pilot sequence with said error feedback in order to obtain a crosstalk estimation between said communication lines;
   selecting a subset of one or more communication lines from said preceding group;
   selecting the pilot sequence based on a number of communication lines in the subset; and the transmitting the pilot sequence transmits said pilot sequence only on said subset.

* * * * *